United States Patent
Duff (10) Patent No.: US 6,483,514 B1
(45) Date of Patent: *Nov. 19, 2002

(54) MOTION BLURRING IMPLICIT SURFACES

(75) Inventor: Thomas Douglas Selkirk Duff, Berkeley, CA (US)

(73) Assignee: Pixar Animation Studios, Emeryville, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/292,456

(22) Filed: Apr. 15, 1999

(51) Int. Cl.$^7$ .............................................. G06T 15/70
(52) U.S. Cl. ...................... 345/474; 345/427; 345/629
(58) Field of Search ................................ 345/473, 474, 345/475, 427, 428, 581, 582, 586, 611, 619, 629, 630, 634, 643, 655, 654, 653, 666, 672, 673, 441, 442, 430, 433, 435, 127, 131, 136, 138

(56) References Cited

PUBLICATIONS

Desbrun et al ("Animating Soft Substances with Implicit Surfaces": Proceedings of the 22nd Annual ACM conference on Computer Graphics, Aug. 6–11, 1995, Los Angeles, CA).*

DeCarlo et al ("An Anthropometric face model using variational techniques": pp. 67–74: Proceedings of the 25th annual conference on computer graphics, Jul. 19–24, 1998).*

Lucas (Real–time face recognition with the continuous n–tuple classifier: Lucas, S.M., IEE Colloquium on High Performance Architectures for Real–Time Image Processing, 1998).*

Wyvill et al., "Solid Texturing of Soft Objects," *IEEE Computer Graphics and Applications* 7(12): Dec. 20–26, 1987.

Tom Duff, "Interval Arithmetic and Recursive Subdivision for Implicit Functions and Contructive SOlid Geometry", *Computer Graphics*, No. 26, vol. 2, Jul. 1992.

R.L. Cook, L. Carpenter, E. Catmull, "The Reyes Image Rendering Architecture", *Computer Graphics*, vol. 21, No. 4, Jul. 1987.

W.E. Lorensen, H.E. Cline, "Marching Cubes: A High Resolution 3D Surface Construction Algorithim", *Computer Graphics*, vol. 21, No. 4, Jul. 1987.

Rayomd E. Moore, "Method and Applications of Interval Analysis", *SIAM*, Philadelphia, 1979, pp. 24–29.

Jules Bloomenthal et al., "Introduction to Implicit Surfaces", Morgan Kaufmann Publishers, Inc., San Francisco, 1997.

* cited by examiner

Primary Examiner—Mano Padmanabhan
(74) Attorney, Agent, or Firm—Arent Fox Kintner Plotkin & Kahn PLLC

(57) ABSTRACT

The present invention allows for rendering, with a micropolygon renderer, motion blurred images of objects modeled and animated with the most commonly used class of implicit surfaces. The invention introduces the technique of automatic implicit differentiation to automatically compute the time derivatives of points on the combined surface from the time derivatives of the constituent surface elements while evaluating the combined field function that defines the composite surface.

12 Claims, 4 Drawing Sheets

MOTION BLURRING IMPLICIT SURFACES

FIELD OF THE INVENTION

The present invention relates generally to the field of computer graphics and computer generated animation. More specifically, the invention relates to rendering photorealistic images of moving objects modeled with implicit surfaces.

BACKGROUND OF THE INVENTION

Surfaces of objects to be rendered in computer graphics can be numerically described by different mathematical models. Some surface models, e.g., NURBS (non-uniform rational B-Splines), are most naturally specified in terms of a local parameterization, i.e., a mapping from $R^2$ to $R^3$ in which the parameters, conventionally taken as u and v, serve as local coordinates on the surface and the location in three dimensional object space of a point on the surface is specified as an explicit function of the u and v parameters: $x(p)=f_1(u, v)$; $y(p)=f_2(u, v)$; $z(p)=f_3(u, v)$.

Parametric surface definitions are handy but cumbersome and become more cumbersome when one attempts to model objects of non-trivial topology. To model surfaces which are not topologically equivalent to a sheet, cylinder or torus (or one of its twisted variants, e.g., a Klein bottle), one must explicitly stitch together different parameterization patches. Insuring continuity and smoothness across patch boundaries can be difficult, particularly when animating the models.

An alternative class of mathematical models that have become popular for more efficiently and elegantly modeling organic looking objects with smoothly blended curved surfaces are those defined by implicit functions, i.e., as equipotentials of a scalar field. See, e.g., J. Bloomenthal, et al., *Introduction to Implicit Surfaces* (1997). Complicated surfaces can be modeled by combining scalar fields that define simpler constituent surface elements. Depending on how one combines the constituent scalar fields, one can obtain surfaces that smoothly blend the constituent shapes, or are the precise union, intersection, or subtraction of the constituents or any combination thereof.

The ability to specify complicated smoothly blended shapes merely by combining simple functions is a key advantage to modeling with implicit surfaces. One is thereby able to both intuitively and efficiently build elegant and complicated surfaces. Inplicit surfaces offer additional advantages in computer generated animation. With implicit surfaces, one can model the motion of a complicated blended surface merely by specifying the motion of its individual constituent objects. In addition, one can easily model surfaces of changing topology. Depending on the distance between constituent objects and the manner in which the field functions are combined, objects will automatically combine and separate. This is particularly useful in modeling the motion of fluids, e.g., splattering raindrops.

The advantage of implicit surface animation, that one can determine the shape of the surface at anytime by merely performing the appropriate combination of field functions of the constituent elements, has the corresponding disadvantage, that one cannot relate a particular point on a surface defined at time $t_1$ to a point on the surface at a different time, $t_2$. Even if the motion of points on the constituent surfaces is specified (which in some cases is more information than is needed to model the surface which requires only the constituent field functions as a function of time), it is far from obvious how to determine the motion of points on the combined surface. The problem is most apparent when one considers the areas of "blend" between constituent surface elements, i.e., where the points being considered are on none of the consistent surfaces.

The inability to determine the motion of specific points on the surface can be a serious (fatal) hindrance to doing computer animation with implicit surfaces with certain important and widely used rendering systems. In particular, to incorporate motion blur in a micropolygon render, e.g., the REYES architecture as implemented in Pixar's Photo-Realistic Renderman®, one most be able to calculate the change in position of micropolygon vertices during the time in which the fictional camera shutter is open.

A solution to the problem of determining the motion of particular identified points on a surface defined by the equipotentials of an arbitrary computable combination of scalar fields is therefore required in order to fully utilize implicit surface modeling techniques in high quality computer animation.

SUMMARY OF AN EXEMPLARY EMBODIMENT

The present invention allows for rendering, with a nicropolygon renderer, motion blurred images of objects modeled and animated with the most commonly used class of implicit surfaces (i.e., those formed as a combination of constituent elements for which one is able to specify the motion). The invention introduces the technique of automatic implicit differentiation to automatically compute the time derivatives of points on the combined surface from the time derivatives of the constituent surface elements (which must be supplied by the animator) while evaluating the combined field function that defines the composite surface.

DETAILED DESCRIPTION OF AN EXEMPLARY EMBODIMENT

I. A Suitable Computer System

Figure 1:
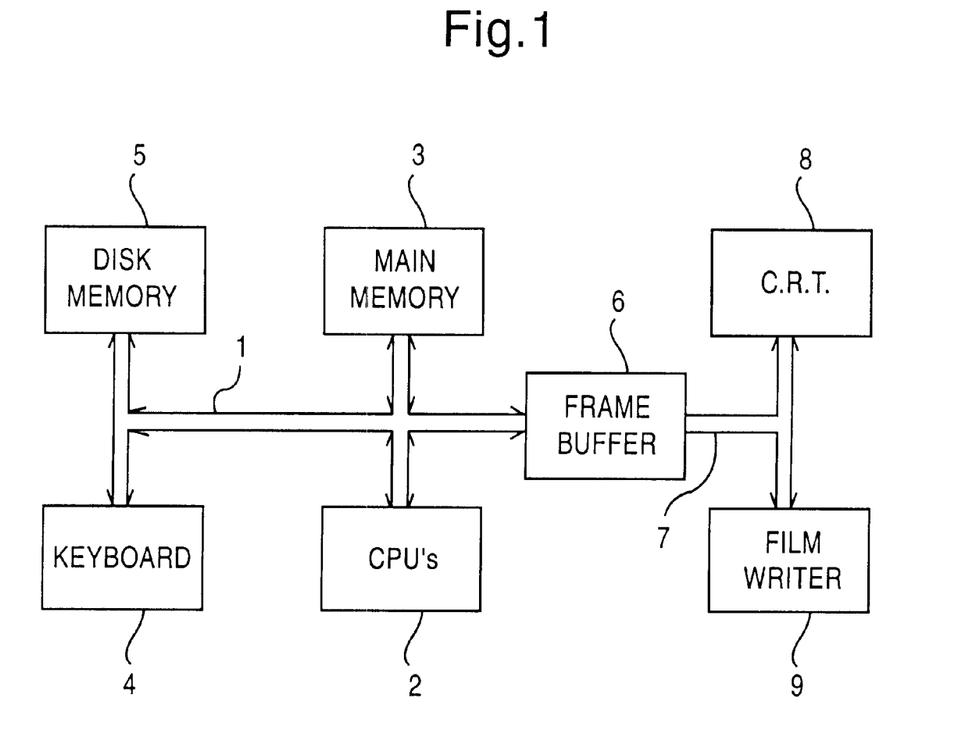
FIG. 1 shows generally the elements of a computer system suitable for carrying out the present invention.

FIG. 1 shows a computer system suitable for carrying out the invention. A main bus 1 is connected to one or more CPU's 2 and a main memory 3. Also connected to the bus are a key board 4 and large disk memory 5. The frame buffer 6 receives output information from the main bus and sends it through another bus 7 to either a CRT or another peripheral which writes the image directly onto film.

II. Modeling with Implicit Surfaces

An implicit surface is defined by a level function or equipotential of a scalar field. That is, given a function F and constant T, the surface is defined as all points for which $F(x, y, z)=T$. A simple example is $x^2+y^2+z^2=1$ which defines the unit sphere. One can always redefine the function F to $F'=F-T$ so that the surface is defined by the equation $F'(x, y, z)=0$. In this form, the value of F' is related to the distance from the surface. The function F' naturally divides space into regions interior and exterior to the surface. Points with a negative value of F' are in the interior and points with positive value are in the exterior. That implicit surfaces (unlike parametric surface patches) have this natural volume interpretation adds to their utility in modeling three dimensional objects.

Another key benefit of implicit surface modeling is the ability to combine simple surface elements into complex objects by merely combining the constituent field functions. The manner in which the functions are combined determines the appearance of the combined surface. A surface defined by the sum of constituent field functions for example results in a surface in which the constituent surfaces distort and smoothly blend. In contrast, a surface defined by the maximum of a set of constituent field functions will define a surface that is the precise union of the constituent elements. Similarly, a surface defined by the minimum of a group of constituent field functions will define a surface that is the intersection of the constituent surfaces. These are obviously but a few of the possibilities. Any logical or mathematical function of the constituent fields will result in a new field function defining a surface related in some more or less obvious way to the surfaces defined by the constituent functions. For instance, subtracting one function from another will result in a smoothly blended carve out of one surface from the other.

To better understand how the blending of constituent surfaces occurs, it is helpful to consider the simple, yet important case of "blobby" objects formed from multiple spheres. The field function for a single sphere centered at the point $P_1=(x_1, y_1, z_1)$ is given by $f_1(x, y, z)=g((x-x_1)^2+(y-y_1)^2+(z-z_1)^2))=c$, were $g(r^2)$ is amonotonically decreasing function usually taken to be of finite range. One well known choice is $$g(r^2) = \left(1 - \left(\frac{r^2}{R^2}\right)\right)^3$$

for $r^2 \leq R^2$ and 0 otherwise. The constant R defines the radius of influence of the sphere while the radius of the surface itself is determined by c.

To smoothly blend a collection of n spheres one can use a combined field function of the form $$\sum_{i=0}^{n-1} f_i(x, y, z) = c.$$

Figure 2:
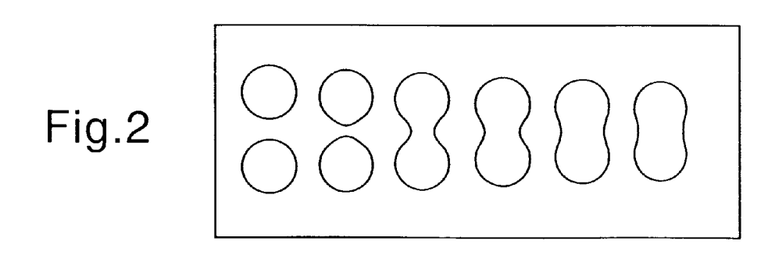
FIG. 2 shows the cross sections of approaching blended spheres.

If the points $P_i$ at which each sphere is centered are separated by a distance greater than 2R, than the resulting surface is just the disconnected union of spheres. If, however, the sphere centers get closer than 2R, the component fields reinforce each other, drawing the components of the surface toward each other so that they eventually blend into one another. FIG. 2 shows the cross-sections of two approaching blobs, first with their nearest points being pulled toward one another, then as the protuberances meet being joined by a blend that thickens as they come closer together.

As discussed above combining blobs with operators other than addition produces other effects. Subtracting one blob from another carves out a smoothly blended hole. Taking the maximum of two blobs performs their CSG (Constructive Solid Geometry) union. Taking the minimum yields the intersection. Combining blobs or other constituent surface functions with more complicated operations combines the surfaces in more complicated ways that are easier seen than described.

III. The REYES Renderer

Pixar's Photorealistic Renderman® implements the Reyes rendering architecture, see Cook et al., "The Reyes Image Rendering Architecture," *Computer Graphics*, Volume 21, Number 4, July 1987, incorporated herein by reference. In the Reyes system, all objects (regardless of mathematical model) are diced into grids of micropolygons, flat-shaded quadrilaterals, that, when projected onto screen space, are approximately ½ pixel on a side. Micropolygons are thus the common basic geometric unit of the algorithm. Visible micropolygons that overlap a jittered subpixel sample point contribute to the rendered pixel.

Because micropolygons are separately and individually processed through the latter stages of the Reyes rendering pipeline, micropolygon vertices are special points on the surface whose coordinates are stored as a grid. To render a scene with motion blur in the Reyes system, the distance and direction that each rendered micropolygon moves during the fictional shutter exposure time must be calculated. Using this information, micropolygons are moved for each sample point to a jittered time (i.e., a randomly determined time within the shutter exposure time for the scene being rendered) associated with that sample.

Figure 3:
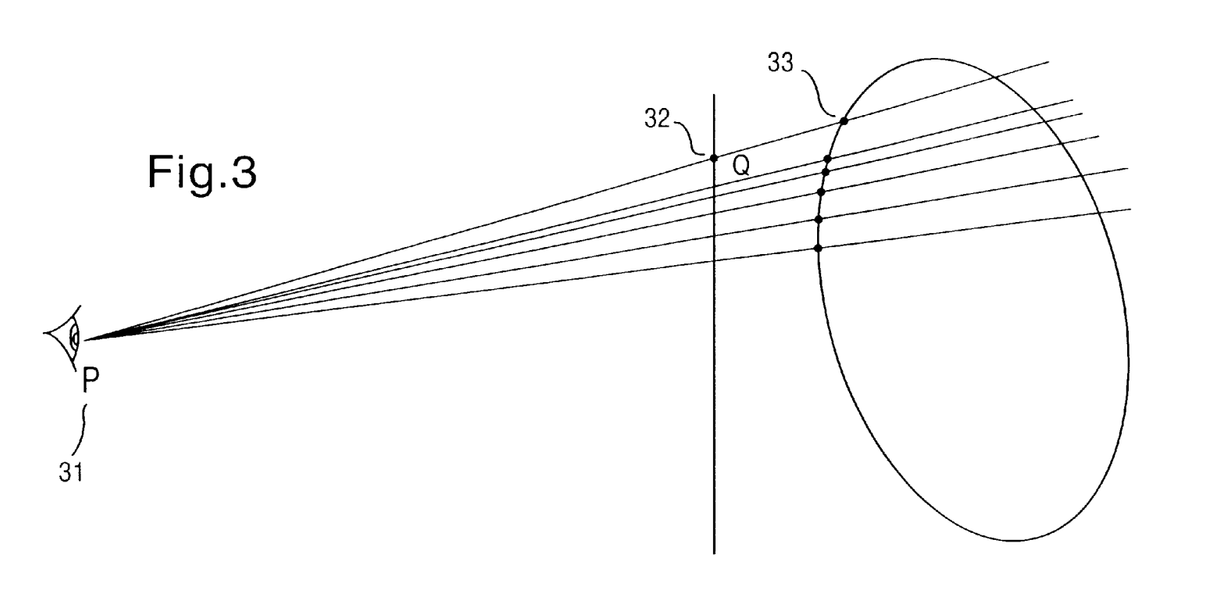
FIG. 3 shows the dicing of an implicit surface into micropolygons.

In modeling with parametric surfaces, one can efficiently dice the surface into micropolygons whose sides are parallel to the (u, v) patch coordinates. When dicing implicit surfaces one does not have such a handy local coordinate system along which to slice. One can, nonetheless, fairly straightforwardly create a micropolygon grid that dices the surface and determines the object space coordinates of the micropolygon vertices. A straight forward ray casting method for dicing an implicit surface into micropolygons is shown in FIG. 3. One sends out an array of rays from a point P, 31, behind the viewing plane which are generally in the z direction and which will intersect the visible portion of the implicit surface such that the points of intersection form a quadrilateral grid. Each point of intersection between a given ray and the visible portion of the implicit surface can serve as a micropolygon vertex whose location can be determined by solving the implicit surface field equation along the ray. Using the parametrized equation for the line, $L(s)=P+(Q-P)s$ and substituting it into the field equation $F(L(s))=C$, one obtains a single equation for s which can be solved numerically. The smallest root will give the point along the parametrized line at which the ray first intersects the implicit surface, which by construction will be the location of a micropolygon vertex. 32 shows the point Q for one ray of interest and shows its intersection with the implicit surface, i.e., the location of a micropolygon vertex.

Marching cubes (See W. Lorensen and H. Cline, "Marching Cubes: A High Resolution 3D Surface Construction Algorithm," *Computer Graphics*, Volume 21, No. 4 (1987)) and related algorithms may also be used to polygonalize the implicit surface. Recursive methods of that type (and in particular the approach described in T. Duff, "Interval Arithmetic and Recursive Subdivision for Implicit Functions and Constructive Solid Geometry," *Computer Graphics*, Volume 26, Number 2, 1992) will benefit in efficiency if used in conjunction with the tree description of composite surfaces described below.

The difficult problem addressed by the present invention is determining how a micropolygon vertex (or any other identified point on the surface) moves in time. As will be described below, one can derive simple rules which can be efficiently implemented on a computer that will provide the derivatives (or approximations thereof in the form of finite incremental motion) of points on a surface defined by an arbitrarily complicated combination of constituent surfaces, where the animator need only specify the motion of the constituent surfaces.

IV. Automatic Differentiation

As an introduction to the methodology of the present invention, it is useful to consider the technique of automatic differentiation, by which derivatives of arbitrary computable functions can be calculated by mechanically transforming a program that computes a function into one that computes its derivative. An excellent exposition of this technique can be found at pages 24 to 29 of Ramon Moore's monograph *Methods and Applications of Interval Analysis* (SIAM, Philadelphia, 1979), incorporated herein by reference.

Considering the basic operations that can be performed on variables that are themselves functions of an independent variable, e.g., v(t), using elementary calculus one can write down the following rules and many more (for notational simplicity we write d/dt as D):

$$D(u+v)=Du+Dv$$

$$D(u-v)=Du-Dv$$

$$D(uv)=uDv+vDu$$

$$D(u/v)=(vDu-uDv)/v^2$$

$$Du^n=nu^{n-1}Du$$

$$De^u=e^uDu$$

$$D\sin u=\cos u Du$$

etc.

Using these and similar rules, a computer program that evaluates functions of u(t) or v(t) can be modified so that each instance of a scalar variable, e.g., u or v, can be replaced with the ordered pair (u, Du) and all computations can be rewritten to keep track of both the value of the function and its derivative. Some basic operations for example would be modified as follows:

$$(u, Du)+(v, Dv)=(u+v, Du+Dv)$$

$$(u, Du)-(v, Dv)=(u-v, Du-Dv)$$

$$(u, Du)(v, Dv)=(uv, vDu+uDv)$$

$$(u, Du)/(v, Dv)=(u/v, (vDu-uDv)/v^2)$$

$$e^{(u, Du)}=(e^u, e^uDu)$$

$$\sin(u, Du)=(\sin u, Du\cos u)$$

etc.

The process of replacing variables with ordered pairs and redefining the operations on them as shown above, automatically converts a program that computes an arbitrary function f(t) into a program that computes not only f but also Df. A slightly modified compiler can do this transformation automatically so that it is transparent to the end user who need only supply a program that calculates f(t).

V. Implicit Motion

Automatic differentiation can be used to determine the time derivatives of points on a parametrized surfaces where the time dependence is specified by explicit parametric equations of the form $x(t)=f_1(u(t), v(t),t)$, $y(t)=f_2(u(t), v(t), t)$, $z(t)=f_3(u(t), v(t), t)$. Automatic differentiation is no help, however, in dealing with implicit surfaces, where one lacks an explicit parametric equation for the coordinates of the surface points. Moreover, in the case of a time varying implicit surface one generally has only a single equation of the form $f(x, y, z, t)=C$ from which it is not generally possible to determine Dx, Dy, and Dz for a point on the surface.

One aspect of the current invention can be viewed as an extension of the technique of automatic differentiation to implicit functions. Though one cannot avoid the fact that a single equation is insufficient to specify the three required time derivatives, as will be described in more detail below, another aspect of the current invention allows one to automatically determine the time derivatives of points on a composite surface from available constituent motion information (i.e., information that must be supplied in any event by the animator/modeler to define the scene).

A. Derivation of Automatic Implicit Differentiation in One Dimension

To understand the method of automatic implicit differentiation and how it can be used to solve the problem of motion blurring implicit surfaces, it is useful to begin in one dimension where a time varying implicit "surface" is specified by an equation of the form $f(x, t)=C$. In the one dimensional case, this single equation provides enough information to solve for both x and Dx as functions of time.

Given a one dimensional implicit "surface" specified by $f(x, t)=C$ one can differentiate both sides and solve the resulting algebraic equation for Dx. For example, suppose $f(x, t)=2x^2+xt-t^2=0$, taking the time derivative of both sides and solving for Dx one gets the following:

$$D(2x^2+xt-t^2)=0$$

$$2Dx^2+Dxt-Dt^2=0$$

$$4xDx+tDx+xDt-2t=0$$

$$(4x+t)Dx+x-2t=0$$

$$Dx=\frac{(2t-x)}{(4x+t)}$$

For t=1, x=½ is a point on the surface at which Dx=½.

This technique of implicit differentiation is of course standard and well known to students of multivariable calculus. What is less commonly appreciated is that whenever Df(x,t) is reduced to a function of Dx, x, and t, that function is always linear in Dx. Using this fact, one can write down rules for implicitly differentiating more complicated functions in terms of simpler ones, much as was done above in the discussion of automatic differentiation. Because of the linearity in Dx described above, given functions u(x, t) and v(x, t) one can always write Du=pDx+q and Dv=rDx+s where p, q, r, and s are functions of x and t but not Dx. Using basic calculus one can then obtain the following basic rules and many more:

$$D(u+v)=Du+Dv=(p+r)Dx+(q+s)$$

$$D(u-v)=Du-Dv=(p-r)Dx+(q-s)$$

$$Du^n=nu^{n-1}Du=pnu^{n-1}Dx+qnu^{n-1}$$

$$D(uv)=uDv+vDu=(ur+vp)Dx+(us+vq)$$

$$D\frac{u}{v}=\frac{vDu-uDv}{v^2}=\frac{(vp-ur)Dx+(vq-us)}{v^2}$$

$$D\max(u, v) \text{ for } u\geq v=Du=pDx+q$$

$$D\max(u, v) \text{ for } u<v=Dv=rDx+s$$

$$D\sin u=\cos u Du=p\cos u Dx+q\cos u$$

$$De^u=e^uDu=pe^uDx+qe^u$$

As in the discussion above of automatic differentiation, it is straightforward to derive such rules for all the basic operations and any more complicated operations of interest. Unlike standard automatic differentiation wherein one converts the operations that compute f into a computation of Df, automatic implicit differentiation converts operations that compute the left hand side of f=T into a computation of the left hand side of Df=0, a linear equation from which it is trivial to solve for Dx.

To implement these rules in a computer program one can replace functions u(x, t) with ordered triplets (u, p, q) where p and q are defined by the equation Du=pDx+q. One can then translate the implicit differentiation rules given above into a particular form of arithmetic on triplets of numbers (u, p, q) and (v, r, s). For constants, x, and t, one writes (c, 0,0), (x, 1,0) and (t, 0,1) respectively. For some basic operations one then obtains the following triplet arithmetic rules:

$$(u, p, q)+(v, r, s)=(u+v, p+r, q+s)$$

$$(u, p, q)-(v, r, s)=(u-v, p-r, q-s)$$

$$(u, p, q)^n=(u^n, pnu^{n-1}, qnu^{n-1})$$

$$(u, p, q)(v, r, s)=(uv, ur+vp, us+vq)$$

$$(u, p, q)/(v, r, s)=(u/v, (vp-ur)/v^2, (vq-us)/v^2)$$

$$\max((u, p, q), (v, r, s))=(u, p, q) \text{ for } u \geq v$$

$$\max((u, p, q), (v, r, s))=(v, r, s) \text{ for } u < v$$

$$\sin(u, p, q)=(\sin u, p\cos u, q\cos u)$$

$$e^{(u, p, q)}=(e^u, pe^u, qe^u)$$

etc.

These triplet rules and any others that are required for any basic operations one desires to perform on x and t, can be substituted for regular (non-triplet) operations in any computer program that computes an implicit-function field f, resulting in a program that computes the triplet (f, a, b) from which one can immediately get the value of the derivative Dx=-b/a. This triplet substitution can be done automatically by a simple compiler or by using C++ operator overloading with an appropriate class definition. One could also build a hardware implementation whose memory and ALU (Arithmetic Logic Unit) operated on triples as defined above, so that by running a program that computes the value of field functions one would also automatically get derivative values as well.

B. Application of Automatic Implicit Differentiation to Composite Implicit Surfaces in Three Dimensions Unfortunately the three dimensional case is not quite so simple nor completely solvable. The obvious problem being that Df=0 is but a single equation, at least two shy of what is needed to solve for Dx, Dy and Dz. Fortunately, in most applications of implicit surfaces in computer graphics and animation, one utilizes surfaces and field functions that are built from simpler constituent surfaces defined by simpler functions, or primitives, $u_1(x, y, z, t), u_2(x, y, z, t) \ldots , u_n(x, y, z, t)$.

To specify the scene, the animator must supply motion information for the primitives. This information is often sufficient to determine the motion of identified surface points (would be micropolygon vertices). In this common case, the total field function F(x, y, z) can be written as a function $F(u_1, \ldots , u_n)$. Given this decomposition and animator supplied motion information for points on the would be surfaces defined by the constituent functions $u_i(x, y, z, t)=c$, one can automatically compute motion information for any point on the surface defined by the combined function F using the automatic implicit differentiation rules defined above for the one dimensional case.

As an example, consider again the blended sphere case but now with the spheres in motion. Each sphere primitive is defined by a field function $u_i(x, y, z, t)=g((x-x_i(t))^2+(y-y_i(t))^2+(z-z_i(t))^2)$ where again $g(r^2)=(1-(r^2/R^2))^3$ if $r^2<R^2$ and is 0 otherwise. In this case, the animator supplied constituent motion information is the explicit time dependence of the constituent sphere centers, which is sufficient if the motion of points on the sphere surfaces are intended to follow the centers, i.e., the spheres do not rotate and remain rigid, but for blending. In this case the constituent motion information, e.g., $Dx_i=D(x_i)$ (similarly for y and z) and is constant (has no spatial dependence) within R of the sphere center, $((x_i(t), y_i(t), z_i(t))$ and for small $\Delta t$ can be taken as $(D_i x, D_i y, D_i z)=(x_i(t+\Delta t)-x_i(t), y_i(t+\Delta t)-y_i(t), z_i(t+\Delta t)-z_i(t))/\Delta t$.

To apply the automatic implicit differentiation rules one must first convert to triplets of the form $(u_i, p_i, q_i)$ where $p_i Dx_i+q_i=0$. One has freedom in choosing $p_i$ and $q_i$ (multiplication by a common factor leaves their defining equation unaltered). Instead of taking $p_i=1$ and $q_i=-Dx_i$, a more useful choice is to take $p_i=u_i(x, y, z, 0)$ and $q_i=-p_i Dx_i$.

Substituting this choice into our triplet sum rules yields $$F(x, y, z, t) = \sum_{i=0}^{n-1} u_i(x, y, z, t)$$

$$P = \sum_{i=0}^{n-1} p_i = \sum_{i=0}^{n-1} u_i(x, y, z, 0)$$

$$Q = \sum_{i=0}^{n-1} q_i = -\sum_{i=0}^{n-1} u_i(x, y, z, 0)Dx_i$$

Solving PDx+Q=0 for Dx gives $$Dx = \frac{\sum_{i=0}^{n-1} u_i(x, y, z, 0)Dx_i}{\sum_{i=0}^{n-2} u_i(x, y, z, 0)}$$

and similarly for Dy and Dz.

In hindsight, this weighted sum result is not surprising. It has the following expected properties: (1) If the motion of all primitives is the same, i.e., all $Dx_i$ are equal, then $Dx=Dx_i$, so rigid translation of the primitives as a group implies rigid translation of the combined surface; (2) Wherever $u_i(x, y, z)=0$, it contributes nothing to the motion of the combined surface; (3) Where only one of the $u_i$ is nonzero, it completely determines the motion of the combined surface.

In this simple example of summing "rigid" spheres one could likely have arrived at the combined motion result without all of the automatic implicit differentiation machinery of the present invention. The present invention, however, applies beyond simple sums to arbitrary (computable) combining functions.

E. Implementation Details

1. Surface Trees or Graphs

Figure 5:
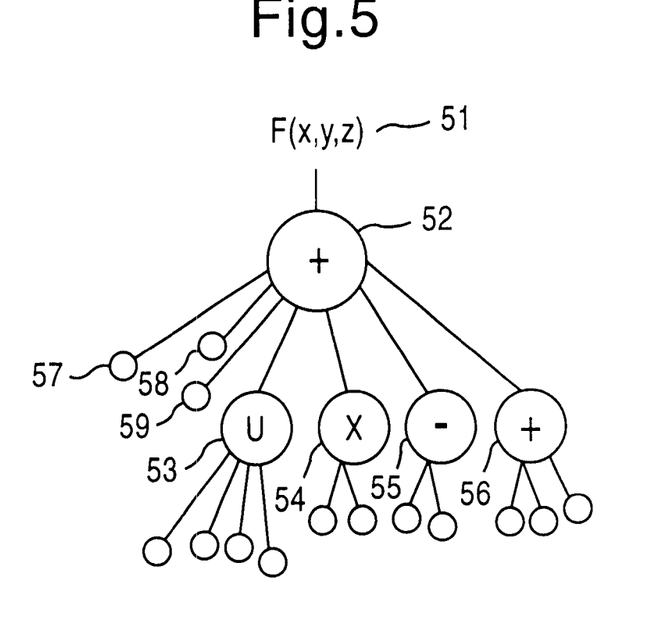
FIG. 5 shows a tree representation of a composite surface.

It is useful in implementing the present invention to represent composite surfaces as trees, or somewhat more generally as directed acyclic graphs ("DAGs"), with constituent primitive surfaces as leaves or exterior nodes and arithmetic or logical operations as interior nodes. FIG. 5 shows a diagram of an exemplary tree. 51 shows the field function for the composite implicit surface at the top of the tree. The node 52 combines the next level of constituent field functions through addition (this is just one example, one could combine the functions at this level with any arithmetic or logical operation depending on the desired appearance of the combined surface). Node 52 combines both constituent primitives, 57, 58 and 59 and the results of combinations at the next lower level of interior nodes, 53–56, each of which combines primitive constituent fields with a particular arithmetic or logical operation. Obviously one could construct much more complicated trees (and surfaces) with arbitrary levels of interior nodes.

There are several advantages to a tree or DAG representation. First, it allows one to propagate motion information automatically up the tree (or through the DAG) by replacing standard arithmetic with n-tuple arithmetic at each interior node. One can thereby evaluate the field function and motion information for arbitrarily complex composite surfaces using only the handful of n-tuple arithmetic rules derived above. Another advantage of a tree or DAG representation arises when used in conjunction with a recursive algorithm like marching cubes or its variants for locating and micropolygonizing the surface. See, e.g., T. Duff, "Interval Arithmetic and Recursive Subdivision for Implicit Functions and Constructive Solid Geometry," Computer Graphics, Volume 26, Number 2, July 1992. As described in detail therein, one can avoid evaluating branches of trees for which evaluation at a higher node indicates that the branch's lower level constituents do not contribute Within the spatial region being investigated.

Though trees or DAGs are useful for some purposes, as will be apparent to one of ordinary skill in the art, the present invention is in no way limited to the use of any particular data structure for representing combined implicit surfaces, including those described above. Automatic implicit differentiation can be used to calculate the motion of points on any surface defined by a combination of primitive implicit functions. The combination of primitive implicit functions defining a particular surface of interest may in some cases not be specified or specifiable by a DAG with operator interior nodes and operand exterior nodes. The surface may instead be formed from constituent primitive functions by an arbitrary computer program including, e.g., conditional branches, loops, recursive function calls, etc. Using automatic implicit differentiation one can, nonetheless, mechanically convert the arbitrary computer program that combines the constituent primitive functions to one which also calculates the motion information for any point on the combined surface from motion information for the constituent primitives.

2. Higher Tuples

Using the triplet rules described above, one computes Dx, Dy, and Dz by evaluating the tree three times with appropriate initial values for $(u_i, p_i, q_i)$. In doing so one unnecessarily computes the function F(x, y, z) three times. Combining the three triplets into a single 7-tuple $(u, p_x, q_x, p_y, q_y, p_z, q_z)$ avoids this duplication. If, however, one exploits the freedom in defining p and q described above (i.e., takes $p_x = p_y = p_z = u(t = t_0)$) then one can reduce the 7-tuple to a 5-tuple $(u, p, q_x, q_y, q_z)$. In the triplet arithmetic rules of automatic implicit differentiation, p of a result always depends only on the constituent functions and their ps and never on their qs so that the 5-tuple structure is consistent and will persist throughout the computation.

3. More General Blobby Motion

Figure 6:
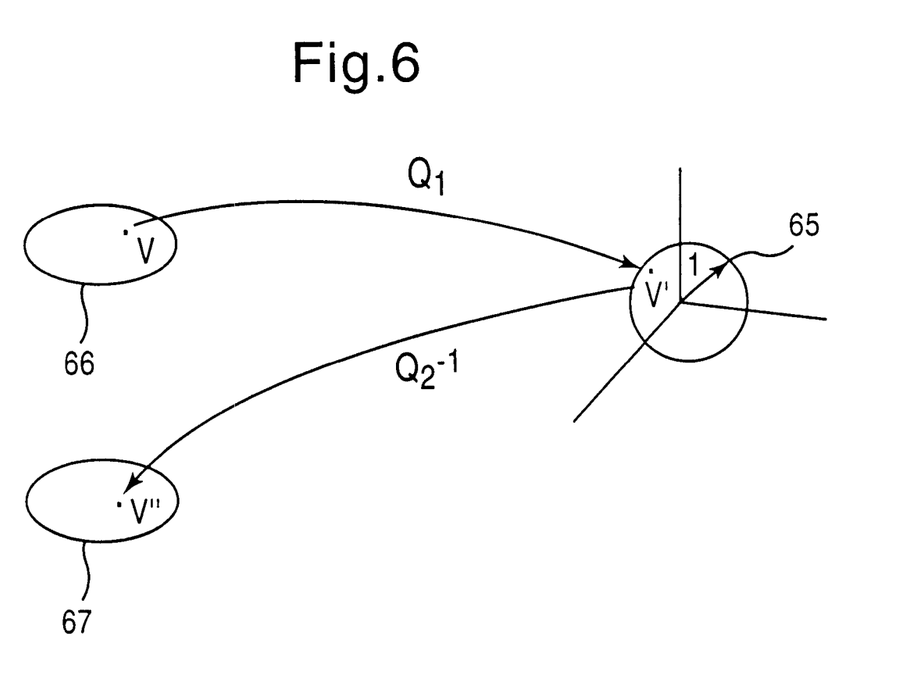
FIG. 6 shows affine transformations taking the unit sphere centered at the origin to a constituent blob at two different times.

In the simple example described above, for ease of explanation the constituent motion was taken to be rigid constant velocity translation. One is in no way so limited in implementing the present invention. As a more general framework for calculating blobby sphere motion consider that shown in FIG. 6. 65 shows a constituent primitive as a unit sphere centered at the origin, defined by the constituent field function u(p)=0 (where $u(p)=x^2+y^2+z^2-1$). One can represent any translated, rotated, or squished ellipsoid by composing this field function with an affine transformation of its argument. The squished and translated ellipsoid 66 is the constituent surface defined by the field function $u(\phi_1(p))=0$. Similarly the ellipsoid 67 is defined by the field function $u(\phi_2(p))=0$ where $\phi_1$ and $\phi_2$ are the appropriate affine transformations. Representing different ellipsoids as affine transformations of a reference unit sphere with the same constituent field function is useful for modeling a blobby constituent at different times. Ellipsoid 66 may be a blobby constituent at time $t_1$ and 67 may be the same blob at a slightly later time (e.g. a frame or less). Given a point v (e.g., a micropolygon vertex) on the surface 66 at $t_1$, one can calculate its position on the surface at $t_2$ by composing the affine transformations as shown in FIG. 6. $\phi_1(v)$ takes the point v on the surface defined at $t_1$ to its corresponding point v' on the reference sphere. $\phi_2^{-1}(v')$ takes the point v' on the reference sphere to its corresponding point on the surface at $t_2$, v". Combining the two, $v''=\phi_2^{-1}(\phi_1(v))$. One can approximate the constituent derivatives at the point v by $$Dx = \frac{(x'' - x)}{(t_2 - t_1)}$$

where x and x" are the x coordinates of v and v" respectively (similarly for y and z). One can thus calculate the required input constituent motion information for any point of interest knowing only the affine transformations that relate the reference sphere to the constituent blob in sequential frames.

Figure 4:
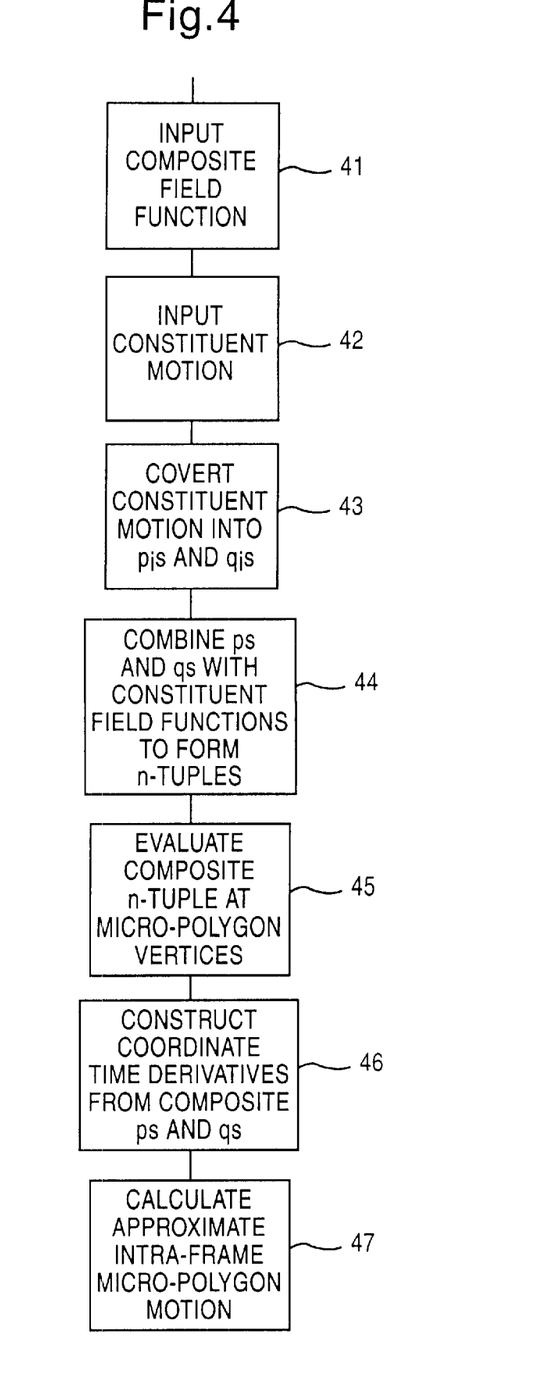
FIG. 4 shows the main steps in calculating the micropolygon motion of a composite implicit surface.

By way of summary, FIG. 4 shows the main steps to calculate intra-frame micropolygon motion using automatic implicit differentiation. In step 41, the composite field function tree that defines the surface being modeled is inputted by the modeler/animator. In 42, the constituent motion information for the leaves is inputted. Alternatively as described above, one may instead input affine transformations or other geometric descriptions of constituent surfaces in sequential frames from which the local constituent motion information can be calculated. In step 43, this constituent motion information is converted to the required canonical form, i.e., $p_{ix} \ldots q_{iz}$ (with $p_{ix}=p_{iy}=p_{iz}=u_i(x, y, z, t_0)$ and $q_{ix}=-p_iDx_i$ being advantageous choices). In step 44, the n-tuples are formed from the ps, qs and us. As discussed above this can be a single 5-tuple for each constituent leaf. In step 45, the composite n-tuple is evaluated at each micropolygon vertex using the above derived n-tuple arithmetic and the surface tree structure. As described above this can be implemented in numerous ways which are transparent to the end-user, e.g., with C++ operator overloading, a modified compiler, or specific hardware implementation. In step 46 the linear equation defining P and Q is trivially solved to yield the derivatives of the composite surface at the micropolygon vertices. In step 47, the composite surface derivatives are used to approximate the intra-frame motion of the micropolygons.

The present invention has been described primarily as a means for calculating polygon motion in order to implement motion blur. The same methods, however, can be used to determine the motion of any identified points on an implicit surface. One can for example use the method to consistently texture map animated implicit surfaces by tracking the motion of points that map to specific texture coordinates.

Appendix A attached hereto contains sample source code in the C language implementing various aspects of the invention described herein. This computer program contains material in which a claim of copyright is made by Pixar, the assignee hereof. Pixar has no objection to the duplication of Appendix A by photocopying of the like but reserves all other copyright rights therein.

The specific arrangements and methods described herein are merely illustrative of the principles of the present invention. Numerous modifications and eliminations in form and detail may be made by those of ordinary skill in the art without departing from the scope of the present invention. Although this invention has been shown in relation to particular embodiments, it should not be considered so limited. Rather, the present invention is limited only by the scope of the appended claims.

APPENDIX A

```
Copyright Pixar 1999
/*
* Sample C code demonstrating how to use automatic implicit
* differentiation to compute vertex motion of points on
* an implicit surface in three dimensions.
*
* In this code, an implicit surface is represented by a
* directed acyclic graph (dag) whose leaf nodes contain
* constants or ellipsoidal blob potentials, and whose
* interior nodes combine the potentials of their children
* according to various operations.
*
* The dag is represented by a pointer to a record of type
* ImplicitCode, which contains the following fields:
*
*   instr  the instruction opcode (e.g. ADD, MULTIPLY, CONSTANT)
*          ADD, MULTIPLY, MAXIMUM and MINIMUM have a
*          variable number
*          of children,
*          SUBTRACT and DIVIDE have 2 children,
*          NEGATE, SINE and EXP have 1 child, and
*          CONSTANT and BLOB have none -- their
*          operand data is stored in op.con or op.blob.
*
*   nchild the number of children (operands) of this operation
*
*   child  an array of pointers to ImplicitCode nodes, one per child
*          this pointer is NULL if the instr is CONSTANT or BLOB
*
*   op     data of type Operand used by leaf nodes, which have
*          instr==CONSTANT or instr==BLOB
*
*   mark   a flag used to ensure that nodes with multiple parents
*          are evaluated just once
*
*   value  the value that automatic implicit differentiation
*          computes for this node.
*
* A record of type Operand contains either the input parameters
* of an ellipsoidal blob or a floating point constant.
*
* The input parameters for an ellipsoidal blob are presented in
* a record of type Blob, whose two fields are transformation matrices:
*
*   m      an affine transformation carrying points on the ellipsoidal
*          surface of the blob to the unit sphere.
*
*   dm     an affine transformation carrying points on the ellipsoid
*          at the beginning of motion to the corresponding points at
*          the end of motion
*
* The values computed by automatic implicit differentiation
* are stored in records of type Ideriv, whose fields are:
*
*   f      the scalar value of the field
*   p, qx, qy, qz
*          coefficients of linear equations
*              p*Dx+qx=0
*              p*Dy+qy=0
*              p*Dz+qz=0
*          used to solve for implicit derivatives
*
```

APPENDIX A-continued

```
* Finally, points in three dimensions are stored in records
* of type Point, whose x, y and z fields are Cartesian
* coordinates.
*/
typedef struct Ideriv Ideriv;
typedef struct ImplicitCode ImplicitCode;
typedef struct Blob Blob;
typedef union Operand Operand;
typedef struct Point Point;
typedef float Matrix[4][3]; /* an affine transformation */
struct Ideriv{
    float f;
    float p;
    float qx, qy, qz;
};
struct Blob{
    Matrix m;         /* carries points on blob to
                         unit sphere */
    Matrix dm;        /* transforms from beginning to end
                         of frame */
};
union Operand{
    Blob blob;
    float con;
};
struct ImplicitCode{
    int instr;        /* instruction opcode */
    int nchild;       /* number of operands */
    ImplicitCode **child;  /* pointers to operands */
    Operand op;       /* leaf operands, type depends
                         on instr */
    int mark;         /* set in evalcode when value
                         is filled in */
    Ideriv value;     /* result of implicit derivative
                         arithmetic */
};
struct Point{
    float x, y, z;
};
enum{
    ADD,
    MULTIPLY,
    MAXIMUM,
    MINIMUM,
    SUBTRACT,
    DIVIDE,
    NEGATE,
    SINE,
    EXP,
    CONSTANT,
    BLOB
};
#include <math.h>
#include <stdio.h>
Point movepoint(ImplicitCode *, Point);
static void evalcode(ImplicitCode *, Point *);
static Ideriv evalblob(Blob *, Point);
static Point xform(Point, Matrix);
static void unmark(ImplicitCode *);
/*
* Point movepoint(ImplicitCode *cp, Point p)
*
* Function movepoint does vertex motion calculations.
* Its inputs are a dag pointed to by cp, describing
* the computations to be done to evaluate the field
* function, and a point p that is on the surface described
* by cp at the start of motion.
*
* The movepoint function calculates the point to which
* p moves at the end of motion.
*
* The steps are:
*
* 1) clear all the mark flags in the dag
*
* 2) call evalcode to compute the coefficients of
* the linear equations whose solution yields the
* derivative vector at p. If the solution is
* indeterminate (that is, the equations are of
```

APPENDIX A-continued

```
 * the form 0Dx=0, 0Dy=0, 0Dz=0) we just assume that
 * there is no motion.
 *
 * 3) solve the equations for dp, the distance that p moves.
 *
 * 4) add the motion vector dp to p and return the result.
 *
 */
Point movepoint(ImplicitCode *cp, Point p){
    Point dp;
    unmark(cp);
    evalcode(cp, &p);
    if(cp->value.p==0) return p;
    dp.x=-cp->value.qx/cp->value.p;
    dp.y=-cp->value.qy/cp->value.p;
    dp.z=-cp->value.qz/cp->value.p;
    p.x+=dp.x;
    p.y+=dp.y;
    p.z+=dp.z;
    return p;
}
/*
 * void evalcode(ImplicitCode *cp, Point *p)
 *
 * Function evalcode calculates the field value
 * of the implicit function described by the dag cp
 * at the point p, and the coefficients of the linear
 * equations that must be solved to obtain the partial
 * derivatives of p with respect to x, y and z.
 * These values are stored in cp->value.
 *
 * The steps in this computation are:
 *
 * 1) If cp->mark is set, then cp has multiple parents
 * and has already been evaluated, so there is no
 * work to do. (This is just an optimization, and is
 * not an essential part of the method.)
 *
 * 2) If cp->child is non-null, this operation has children,
 * whose values are recursively filled in.
 *
 * 3) With the children's values all computed, we dispatch
 * on cp->instr to code that performs the appropriate work
 * to combine the children's coefficients to produce cp->value.
 *
 * 4) Finally, we set cp->mark so that if cp has multiple parents
 * it will only be evaluated once (Again, this is just an
 * optimization.)
 */
static void evalcode(ImplicitCode *cp, Point *p){
    ImplicitCode **chp, **echild;
    Ideriv *t, *u;
    float denominator, cosf;
    if(cp->mark) return;
    if(cp->child!=NULL){
        echild=cp->child+cp->nchild;
        for(chp=cp->child;chp!=echild;chp++) evalcode(*chp, p);
    }
    switch(cp->instr){
    case ADD:
        cp->value.f=0.;
        cp->value.p=0;
        cp->value.qx=0;
        cp->value.qy=0;
        cp->value.qz=0;
        for(chp=cp->child;chp!=echild;chp++){
            t=&(*chp)->value;
            cp->value.f+=t->f;
            cp->value.p+=t->p;
            cp->value.qx+=t->qx;
            cp->value.qy+=t->qy;
            cp->value.qz+=t->qz;
        }
        break;
    case MULTIPLY:
        cp->value.f=1.;
        cp->value.p=0.;
        cp->value.qx=0.;
        cp->value.qy=0.;
        cp->value.qz=0.;
        for(chp=cp->child;chp!=echild;chp++){
            t=&(*chp)->value;
            cp->value.p=cp->value.f*t->p+cp->value.p*t->f;
            cp->value.qx=cp->value.f*t->qx+cp->value.qx*t->f;
            cp->value.qy=cp->value.f*t->qy+cp->value.qy*t->f;
            cp->value.qz=cp->value.f*t->qz+cp->value.qz*t->f;
            cp->value.f*=t->f;
        }
        break;
    case MAXIMUM:
        cp->value=cp->child[0]->value;
        for(chp=cp->child+1;chp!=echild;chp++)
            if((*chp)->value.f>cp->value.f) cp->value=(*chp)->value;
        break;
    case MINIMUM:
        cp->value=cp->child[0]->value;
        for(chp=cp->child+1;chp!=echild;chp++)
            if((*chp)->value.f<cp->value.f) cp->value=(*chp)->value;
    case SUBTRACT:
        t=&cp->child[0]->value;
        u=&cp->child[1]->value;
        cp->value.f=t->f-u->f;
        cp->value.p=t->p-u->p;
        cp->value.qx=t->qx-u->qx;
        cp->value.qy=t->qy-u->qy;
        cp->value.qz=t->qz-u->qz;
        break;
    case DIVIDE:
        t=&cp->child[0]->value;
        u=&cp->child[1]->value;
        cp+=2;
        if(u->f==0) cp->value=*t;
        else{
            denominator=u->f*u->f;
            cp->value.p=(u->p*t->f-u->f*t->p)/denominator;
            cp->value.qx=(u->qx*t->f-u->f*t->qx)/denominator;
            cp->value.qy=(u->qy*t->f-u->f*t->qy)/denominator;
            cp->value.qz=(u->qz*t->f-u->f*t->qz)/denominator;
            cp->value.f=t->f/u->f;
        }
        break;
    case NEGATE:
        cp->value.f=-cp->child[0]->value.f;
        cp->value.p=-cp->child[0]->value.p;
        cp->value.qx=-cp->child[0]->value.qx;
        cp->value.qy=-cp->child[0]->value.qy;
        cp->value.qz=-cp->child[0]->value.qz;
        break;
    case SINE:
        cp->value.f=sin(cp->child[0]->value.f);
        cosf=cos(cp->child[0]->value.f);
        cp->value.p=cp->child[0]->value.p*cosf;
        cp->value.qx=cp->child[0]->value.qx*cosf;
        cp->value.qy=cp->child[0]->value.qy*cosf;
        cp->value.qz=cp->child[0]->value.qz*cosf;
        break;
    case EXP:
        cp->value.f=exp(cp->child[0]->value.f);
        cp->value.p=cp->child[0]->value.p*cp->value.f;
        cp->value.qx=cp->child[0]->value.qx*cp->value.f;
        cp->value.qy=cp->child[0]->value.qy*cp->value.f;
        cp->value.qz=cp->child[0]->value.qz*cp->value.f;
        break;
    case CONSTANT:
        cp->value.f=cp->op.con;
        cp->value.p=0;
        cp->value.qx=0;
        cp->value.qy=0;
        cp->value.qz=0;
        break;
    case BLOB:
        cp->value=evalblob(&cp->op.blob, *p);
        break;
```

APPENDIX A-continued

```
    }
    cp->mark=1;
}
/*
* void unmark(ImplicitCode *cp)
* Clear all the marks on the dag headed by cp
* The steps are:
*
* 1) clear cp->mark
* 2) if cp has children, recursively unmark them.
*/
static void unmark(ImplicitCode *cp){
    ImplicitCode **cpp, **echild;
    cp->mark=0;
    if(cp->child==NULL) return;
    echild=cp->child+cp->nchild;
    for(cpp=cp->child;cpp!=echild;cpp++) unmark(*cpp);
}
/*
* Ideriv evalblob(Blob *b, Point p)
*
* The inputs to evalblob are a description of
* an ellipsoidal blob b and a point p.
* The function calculates the value of the
* potential field at point p, and the coefficients
* required to solve for p's partial derivatives
* with respect to x, y and z. These are returned
*in a record of type Ideriv.
*
* Steps are:
*
* 1) Calculate pf by applying the affine transformation b->m to p.
* The potential function that evalblob calculates has ellipsoidal
* contours. This step transforms p from an ellipsoidal surface
* onto a standard sphere centered at the origin.
*
* 2) Calculate r2,the square of distance from the origin to pf.
*
* 3) If r2>=1, the potential function is zero. Since this potential
* will contribute nothing to any combination, we set all the
* derivative coefficients to zero.
*
* 4) Otherwise, the function is
*
*          2   4    6
* f(r)=1 - 3r + 3r - r
*
* This function has the properties that f(0)=1, with
* derivative 0, and f(1)=0, with its first two derivatives
* also zero. This means that sums of blob potentials blend
* smoothly, but is otherwise unimportant.
*
* 5) Calculate q by applying the affine transformation b->dm to p.
* The value of q is the position to which p should move under
* motion of the blob b.
*
* 6) Fill in derivative equation coefficients so that a later solution
* will determine that the motion vector is q-p. We pick id.p=id.f
* so that when id.f is combined with other values (in evalcode, above)
* these coefficients will be weighted according to the contribution
* of b to the final field value.
*/
static Ideriv evalblob(Blob *b, Point p){
    Ideriv id;
    Point pf, q;
    float r2;
    pf=xform(p, b->m);
    r2=pf.x*pf.x+pf.y+pf.z*pf.z;
    if(r2>=1.){      /* f is identically zero when r2>=1 */
        id.f=0;
        id.p=0;
        id.qx=0;
        id.qy=0;
        id.qz=0;
        return id;
    }
    id.f=((3.-r2)*r2-3.)*r2+1.;
    q=xform(p, b->dm);
    id.p=id.f;
```

APPENDIX A-continued

```
    id.qx=-id.f*(q.x-p.x);
    id.qy=-id.f*(q.y-p.y);
    id.qz=-id.f*(q.z-p.z);
    return id;
}
/*
* Point xform(Point p, Matrix m)
*
* Function xform uses matrix m to calculate
* an affine transformation of point p.
* This is called twice in evalblob, above.
*/
static Point xform(Point p, Matrix m){
    Point pf;
    pf.x=p.x*m[0][0]+p.y*m[1][0]+p.z*m[2][0]+m[3][0];
    pf.y=p.x*m[0][1]+p.y*m[1][1]+p.z*m[2][1]+m[3][1];
    pf.z=p.x*m[0][2]+p.y*m[1][2]+p.z*m[2][2]+m[3][2];
    return pf;
}
```

What is claimed is:

1. In computer graphics and computer animation, a method for determining the motion of points on an implicit surface, said implicit surface comprising constituent surface elements defined by constituent field functions, said method comprising a step of:

determining the motion of at least one point on the implicit surface based upon a movement of said constituent surface elements, said constituent field functions, and at least one rule for combining said constituent surface elements with said constituent field functions.

2. The method of claim 1 wherein the motion of points on said implicit surface comprised of constituent surface elements is determined from the motion of said constituent surface elements using rules of implicit differentiation of combined functions.

3. The method of claim 1 wherein the motion of points on said implicit surface comprised of constituent surface elements is determined from the motion of said constituent surface elements by automatic implicit differentiation.

4. The method of claim 1 comprising the steps of:
  a. receiving inputted motion information for constituent surface elements
  b. forming constituent n-tuples comprising the constituent field function and coefficients of a linear equation solvable for the constituent motion;
  c. combining the constituent n-tuples to form an n-tuple for the composite surface comprising the composite field function and coefficients of a linear equation solvable for the motion of points on the composite surface.

5. The method of claim 1, wherein the composite surface is stored and evaluated as a tree or DAG.

6. The method of claim 5 wherein the exterior nodes of said tree or DAG comprise constituent surface field functions and constituent surface motion information.

7. The method of claim 6 wherein the constituent surface motion information comprises coefficients of a linear equation solvable for the constituent motion.

8. The method of claim 6 wherein the interior nodes of said tree or DAG comprise operations for combining field functions and motion information.

9. The method of claim 8 wherein the combining of field functions and motion information at the interior nodes of said tree or DAG is performed using n-tuple arithmetic derived from rules of implicit differentiation of combined functions.

10. A computer-implemented method for rendering blurred intraframe motion of an implicit surface comprising:
   (a) computing an estimate of the time derivatives for points on said implicit surface;
   (b) determining an intraframe blur offset for points on said implicit surface responsive to said estimate of the time derivatives;
   (c) rendering said implicit surface including said motion blur offset.

11. An article of manufacture containing computer code capable of configuring a general purpose computer to determine the motion of points on an implicit surface comprised of constituent surface elements from the motion of said constituent elements.

12. In a graphics system wherein objects are represented by implicit surfaces comprised of constituent surface elements, an apparatus for determining the motion of points on an implicit surface from the motion of its constituent surface elements, the apparatus comprising:
   (a) means for receiving inputted motion information for constituent surface elements;
   (b) means for forming constituent n-tuples comprising the constituent field function and coefficients of a linear equation solvable for the constituent motion;
   (c) means for combining the constituent n-tuples to form an n-tuple for the composite surface comprising the composite field function and coefficients of a linear equation solvable for the motion of points on the composite surface.

* * * * *